F. H. BARTHOLOMEW.
Water-Closet Valve.
No. 2,241. Reissued May 15, 1866.
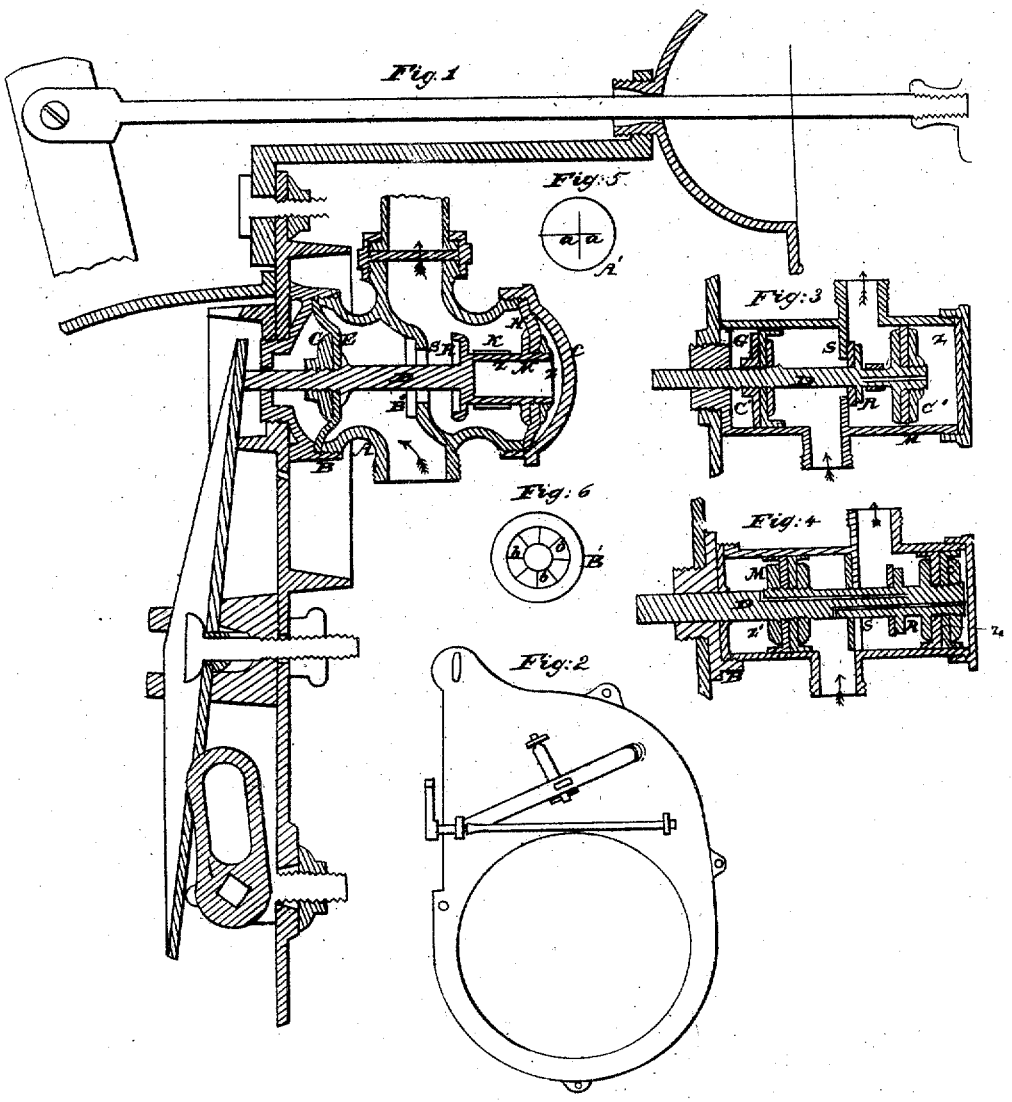

UNITED STATES PATENT OFFICE.

F. H. BARTHOLOMEW, OF NEW YORK, N. Y.

IMPROVEMENT IN WATER-CLOSET VALVES.

Specification forming part of Letters Patent No. 41,269, dated January 19, 1864; Reissue No. 2,241, dated May 15, 1866.

*To all whom it may concern:*

Be it known that I, FREDERICK H. BARTHOLOMEW, of the city, county, and State of New York, have invented a new and useful Improvement in Water-Closets or Valves therefor; and I do hereby declare that the following is a full, clear, and exact description of the same, reference being had to the accompanying drawings, making a part of this specification, in which—

Figure 1 is a vertical central section of my invention. Fig. 2 is a view of the under side of the cover of the closet to which my invention is applied. Figs. 3 and 4 are vertical central sections of modifications of my invention; Figs. 5 and 6, detached views of obstructions placed in the water-passage and pertaining to my invention.

Similar letters of reference indicate corresponding parts in the several figures.

The object of my invention is to provide for a water-closet a cock for supplying the water to the closet, which cock shall be closed by the pressure of the water flowing through it, and at the same time regulating or retarding the closing of the valve, so as to insure a proper supply of water to the pan after the handle is dropped, by combining with it my variable chamber, while the valve (when having been opened by the force applied to tip the pan) shall remain open till closed by the force of water flowing through it, and avoid all extraneous forces capable of closing the valve without the action of the water.

To enable those skilled in the art to fully understand and construct my invention, I will proceed to describe it.

The drawing Fig. 1 illustrates the valve-chamber A, having an inlet and an outlet between which is arranged the valve-opening or valve-seat S, having its valve R and stem D extending longitudinally with the chamber.

At one end of the stem, or otherwise within the chamber described, is arranged my governing-chamber Z, which is formed by securing an india-rubber diaphragm, H, thereto, and confining the diaphragm by the edge to one end of the valve-chamber by a screw-cap, C, thus forming a bellows or an expanding and contracting chamber having a small leak-passage into or out of it, as a drilled hole, M, or any other contracted passage admitting fluid to pass through, through which leak or hole only can the chamber fill. I provide a larger orifice or outlet, L, through which the chamber Z may be rapidly discharged, and provide a valve which will close the latter discharge when the main discharge or flow of water is to be stopped. I employ a rubber band, K, for the valve, to close the said larger orifice.

Other modifications of valve and lever for opening the same, variously constructed and arranged, will answer the purpose required. I close the opposite end of the chamber also with a rubber diaphragm properly secured to the stem by nut G, as shown, the stem also extending through the base-screw or standard-nut B, for the purpose of affording a means of opening the valve when applied to the closet, as here shown. Upon raising the valve-stem, which is done upon lifting the handle of the closet to open the valve, if the water in the supply-pipe shall at the time be shut off the valve will remain open till the water is let on, and then the pressure of water while flowing will act against the two diaphragms. The action of the water against the first-described diaphragm, H, will tend to hold the valve from closing till water can enter into the regulating-chamber Z, and thus distend it as the valve is moved toward its seat, while the pressure of the water against the latter-described diaphragm, E, will force or draw the valve gradually to close upon the seat more or less rapidly in proportion to the size of the opening M or other leak-passage admitting water into the regulating-chamber Z. The pressure of water in chamber Z will aid to close the valve.

The communications leading either out or into the regulating-chamber may be constructed and arranged as here described, or in any other suitable way, so as the described purpose is attained—that is, to retard the motion of the closing of the valve.

By making the induction or supply way larger than the eduction-way a greater pressure is obtained against the latter-described diaphragm, E, to close the valve, and for this purpose I use a flexible self-adjusting obstruction, A′, (see Fig. 5,) placed in the eduction-way, so as to secure a proper pressure of water to close the valve, however diminished the supply of water may be, so that it is supplied under a proper head. This obstruction A′ may be formed of india-rubber or any other suitable flexible or elastic material, and having cross-slits *a* made in it, which will open by the pressure of water, but tending always to assume a closed position will insure a proper pressure against the diaphragm employed to close the valve, as shown herein. A similar obstruction, B′, is shown in Fig. 6, having slits *b* made in it, and so arranged that it may be fitted under the valve-seat surrounding the valve-stem. (See Fig. 1.) The small passage M only into regulating-chamber Z might answer, provided it were not desirable to open the pan of a closet rapidly.

The regulating-chamber Z may be so provided with its discharge-passage that it shall retard the closing of the main valve while either distending or discharging, or both.

Various other plans and modifications might be employed to embrace what I claim to be of my invention and accomplish the purpose described. In Figs. 3 and 4 two modifications are shown. Fig. 3 shows the employment or use of pistons C′ C′, instead of diaphragms, and in Fig. 4 there are two regulating-chambers, Z′ Z′. The same end, however, is obtained in these as in the original plan.

Having thus described my invention, what I claim as new, and desire to secure by Letters Patent, is—

1. In combination with a water-closet, a supply-valve, valve-stem, diaphragm E, and regulating-chamber, said parts being so arranged that the valve may be opened by the manual force applied to it, and closed by the pressure of the water and retarded in its closing, substantially in the manner as and for the purpose set forth.

2. A flexible disk forming an obstruction in the water passage or way of the cock, to operate in the manner substantially as and for the purpose set forth.

F. H. BARTHOLOMEW.

Witnesses:
JAMES P. HALL,
M. M. LIVINGSTON.